(12) United States Patent
Iwatsuki et al.

(10) Patent No.: US 12,142,783 B2
(45) Date of Patent: Nov. 12, 2024

(54) BATTERY MODULE

(71) Applicant: SANYO Electric Co., Ltd., Osaka (JP)

(72) Inventors: Nobuo Iwatsuki, Hyogo (JP); Rui Ma, Hyogo (JP); Tsubasa Michikami, Hyogo (JP); Eiji Kawasaki, Hyogo (JP)

(73) Assignee: SANYO Electric Co., Ltd., Osaka (JP)

( * ) Notice: Subject to any disclaimer, the term of this patent is extended or adjusted under 35 U.S.C. 154(b) by 799 days.

(21) Appl. No.: 17/266,690

(22) PCT Filed: Jul. 26, 2019

(86) PCT No.: PCT/JP2019/029351
§ 371 (c)(1),
(2) Date: Feb. 8, 2021

(87) PCT Pub. No.: WO2020/059298
PCT Pub. Date: Mar. 26, 2020

(65) Prior Publication Data
US 2021/0305654 A1 Sep. 30, 2021

(30) Foreign Application Priority Data
Sep. 19, 2018 (JP) .................................. 2018-175025

(51) Int. Cl.
*H01M 50/30* (2021.01)
*H01M 50/209* (2021.01)
*H01M 50/507* (2021.01)

(52) U.S. Cl.
CPC ......... *H01M 50/30* (2021.01); *H01M 50/209* (2021.01); *H01M 50/507* (2021.01)

(58) Field of Classification Search
None
See application file for complete search history.

(56) References Cited

U.S. PATENT DOCUMENTS

2015/0162578 A1* 6/2015 Kim ..................... H01M 50/507
429/82
2017/0084894 A1* 3/2017 Freiman .............. H01M 50/367
(Continued)

FOREIGN PATENT DOCUMENTS

CN        106605315 A     4/2017
WO      2016/136193     9/2016

OTHER PUBLICATIONS

International Search Report of PCT application No. PCT/JP2019/029351 dated Oct. 15, 2019.
(Continued)

*Primary Examiner* — Lisa S Park
(74) *Attorney, Agent, or Firm* — WHDA, LLP

(57) ABSTRACT

The battery module includes: battery stack configured to have a plurality of stacked batteries, batter stack including valve portion that releases a gas generated in each battery and output terminal; a plurality of bus bars configured to electrically connect output terminals of the plurality of batteries, the plurality of bus bars grouping the plurality of batteries into a plurality of battery units including at least two batteries, the plurality of bus bars connecting in parallel output terminals of batteries in each battery unit, the plurality of bus bars connecting in series battery units; and metal filter configured to be disposed between valve portion and output terminal in a first direction in which valve portion and output terminal are arranged and disposed, in stacking direction of batteries, within an extension range of battery belonging to a first terminal group to which a first bus bar of bus bars is fixed.

4 Claims, 4 Drawing Sheets

(56) References Cited

U.S. PATENT DOCUMENTS

| | | |
|---|---|---|
| 2017/0237055 A1 | 8/2017 | Shimizu et al. |
| 2020/0067045 A1* | 2/2020 | Takano .............. H01M 50/342 |

OTHER PUBLICATIONS

English Translation of Search Report dated Aug. 2, 2022, issued in counterpart CN Application No. 201980060321.1.

* cited by examiner

BATTERY MODULE

CROSS-REFERENCE TO RELATED APPLICATIONS

This application is a U.S. national stage application of the PCT International Application No. PCT/JP2019/029351 filed on Jul. 26, 2019, which claims the benefit of foreign priority of Japanese patent application No. 2018-175025 filed on Sep. 19, 2018, the contents all of which are incorporated herein by reference.

TECHNICAL FIELD

The present invention relates to a battery module.

BACKGROUND ART

For example, a battery module in which a plurality of batteries are electrically connected is known as a power source that requires a high output voltage, for example, for a vehicle. As such a battery module, a battery module having a structure in which a plurality of batteries are connected in parallel by a bus bar to constitute a plurality of battery units and the battery units are connected in series by the same bus bar is known. Each battery constituting the battery module is provided with a valve portion that opens in response to an increase in internal pressure. When gas is generated by a chemical reaction inside the battery and the internal pressure of the battery increases, a high-temperature and high-pressure gas is discharged from the valve portion. Normally, an exhaust duct is connected to each valve portion, and the high-temperature and high-pressure gas discharged from the inside of the battery is discharged through the exhaust duct to the outside of the battery module.

The exhaust gas of the battery includes a flammable gas. Further, the exhaust gas also includes fine particles such as fragments of a battery structure. If the flammable gas and the high-temperature fine particles are discharged to the outside of the module, and the flammable gas, the high-temperature fine particles, and oxygen outside the module are met, ignition may occur. Conventionally, various measures against such ignition have been studied. For example, PTL 1 discloses a structure in which, in an exhaust path for discharging a high-pressure and high-temperature exhaust gas from a battery to the outside of a case body, a plurality of flat plates are disposed inside to change the flow direction of the exhaust gas in a zigzag shape so that the flow path stroke of the exhaust gas is lengthened. In PTL 1, the exhaust gas is reduced in pressure and temperature by lengthening the flow path stroke of the exhaust gas, thereby preventing ignition.

CITATION LIST

Patent Literature

PTL 1: WO 2016/136193 A

SUMMARY OF THE INVENTION

In recent years, there has been a demand for even higher capacities of battery modules, and in order to meet this demand, increases in capacities of batteries have been promoted. As the capacity of a battery increases, the amount of gas discharged from the battery increases. For this reason, there is a risk that ignition may occur outside the module, the scale of ignition may increase, and the safety of the battery module may decrease.

The present invention has been made in view of these circumstances, and an object of the present invention is to provide a technique for enhancing the safety of a battery module.

An aspect of the present invention is a battery module. This battery module includes: a battery stack configured to have a plurality of stacked batteries, the batter stack including a valve portion that releases a gas generated in each battery and an output terminal; a plurality of bus bars configured to electrically connect the output terminals of the plurality of batteries, the plurality of bus bars grouping the plurality of batteries into a plurality of battery units including at least two batteries, the plurality of bus bars connecting in parallel the output terminals of the batteries in each battery unit, the plurality of bus bars connecting in series the battery units; and a metal filter configured to be disposed between the valve portion and the output terminal in a first direction in which the valve portion and the output terminal are arranged and disposed, in a stacking direction of the batteries, within an extension range of a battery belonging to a first terminal group to which an arbitrary first bus bar of the bus bars is fixed.

It should be noted that any combination of the above components and conversions of the expression of the present invention between methods, devices, systems and the like are also effective as aspects of the present invention.

According to the present invention, the safety of the battery module can be enhanced.

DESCRIPTION OF EMBODIMENT

Figure 1:
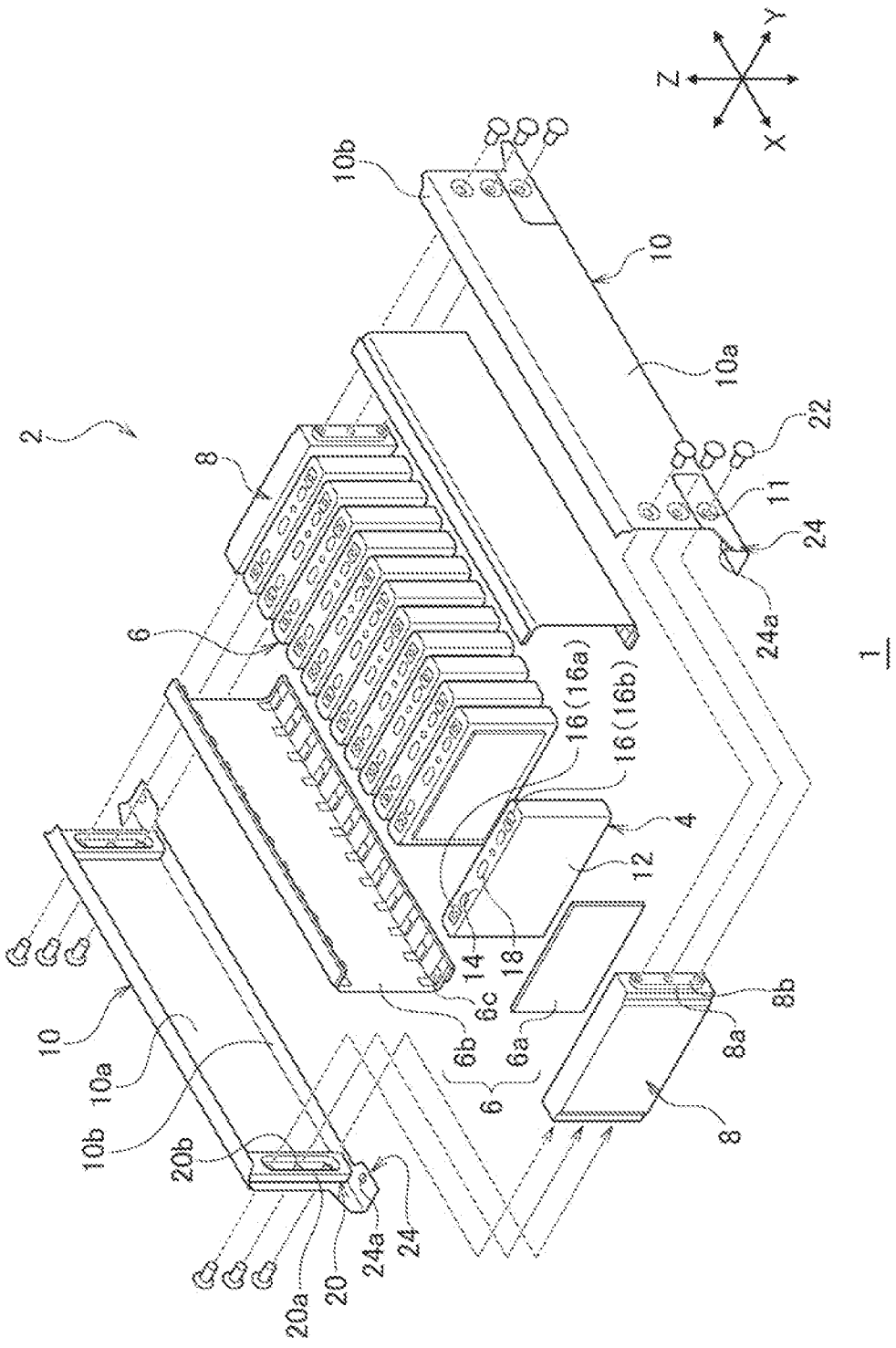
FIG. 1 is an exploded perspective view of a battery stack included in a battery module according to an exemplary embodiment.

Hereinafter, the present invention will be described with reference to the drawings based on a preferred exemplary embodiment. The exemplary embodiment does not limit the invention, but is exemplary, and all the features and combinations thereof described in the exemplary embodiment are not necessarily essential to the invention. The same or equivalent components, members, and processing shown in each drawing are denoted by the same reference numerals, and duplicated description will be appropriately omitted. In addition, the scale and shape of each part shown in each drawing are set for convenience for the sake of easy description, and are not limitedly interpreted unless otherwise specified. In addition, when terms such as "first" and "second" are used in the present specification or claims, these terms do not represent any order or importance unless otherwise specified, but distinguish between a certain configuration and other configurations. Further, in each drawing, some of the members that are not important for describing the exemplary embodiment are omitted.

First, a battery stack included in a battery module of the present exemplary embodiment will be described in detail. FIG. 1 is an exploded perspective view of a battery stack included in the battery module according to the exemplary embodiment. Battery stack 2 included in battery module 1 includes a plurality of batteries 4, separators 6, a pair of end plates 8, and a pair of restraint members 10.

Each battery 4 is a rechargeable secondary battery such as a lithium ion battery, a nickel-hydrogen battery, or a nickel-cadmium battery. Battery 4 is a so-called square battery, and has outer can 12 having a flat rectangular parallelepiped shape. A substantially rectangular opening, which is not shown, is provided on one surface of outer can 12, and an electrode body, an electrolytic solution, or the like is accommodated in outer can 12 through this opening. Sealing plate 14 for sealing outer can 12 is provided at the opening of outer can 12.

Sealing plate 14 is provided with positive electrode output terminal 16 near one end in a longitudinal direction and negative electrode output terminal 16 near the other end. The pair of output terminals 16 are electrically respectively connected to a positive electrode plate and a negative electrode plate, which constitute an electrode body. Hereinafter, positive electrode output terminal 16 will be referred to as positive electrode terminal 16a, and negative electrode output terminal 16 will be referred to as negative electrode terminal 16b. Further, when it is not necessary to distinguish the polarities of output terminals 16, positive electrode terminal 16a and negative electrode terminal 16b are collectively referred to as output terminal 16. Outer can 12, sealing plate 14, and output terminal 16 are conductors, for example, made of metal. Sealing plate 14 and the opening of outer can 12 are joined by welding or the like. Each output terminal 16 is inserted into a through-hole, which is not shown, formed in sealing plate 14. A sealing member having an insulation property, which is not shown, is interposed between each output terminal 16 and each through-hole.

In the present exemplary embodiment, for convenience of description, the surface of outer can 12 where sealing plate 14 is provided is the top surface of battery 4, and the surface facing away from the upper surface of outer can 12 is the bottom surface of battery 4. Further, battery 4 has two main surfaces connecting the top surface and the bottom surface. This main surface is the surface having the largest area among the six surfaces of battery 4. Further, the main surface is a long side surface connected to the long sides of the top surface and the bottom surface. The remaining two surfaces excluding the top surface, the bottom surface, and the two main surfaces are the side surfaces of battery 4. This side surface is a short side surface connected to the short sides of the top surface and the bottom surface. Further, in battery stack 2, the surface on the top surface side of battery 4 is the top surface of battery stack 2, the surface on the bottom surface side of battery 4 is the bottom surface of battery stack 2, and the surface on the short side surface side of battery 4 is the side surface of battery stack 2. Further, the top surface side of battery stack 2 is upward in the vertical direction, and the bottom surface side of battery stack 2 is downward in the vertical direction. These directions and positions are defined for convenience. Therefore, for example, the portion defined as the top surface in the present invention does not mean that the portion defined as the top surface is always located above the portion defined as the bottom surface.

Valve portion 18 is provided between the pair of output terminals 16 on sealing plate 14. Valve portion 18, also called a safety valve, is a mechanism for releasing the gas generated inside battery 4. Valve portion 18 is configured such that the valve can be opened when the internal pressure of outer can 12 rises above a predetermined value to release the gas inside. Valve portion 18 includes, for example, a thin portion provided in a part of sealing plate 14 and thinner than the other portion, and a linear groove formed on the surface of the thin portion. In this configuration, when the internal pressure of outer can 12 rises, the thin portion is torn from the groove to open the valve.

Examples of the gas generated in battery 4 include carbon dioxide gas generated as a result of decomposition of the electrolytic solution. Further, the gas released to the outside of outer can 12 also includes fine particles such as fragments of a battery structure (for example, an electrode body). Valve portion 18 of each battery 4 is connected to exhaust duct 30 described later, and the gas inside the battery is discharged from valve portion 18 to exhaust duct 30.

The plurality of batteries 4 are stacked at predetermined intervals such that the main surfaces of adjacent batteries 4 face each other. In addition, "stacking" means arranging a plurality of members in any one direction. Therefore, stacking batteries 4 includes arranging the plurality of batteries 4 horizontally. Further, each battery 4 is disposed such that output terminals 16 face the same direction. In the present exemplary embodiment, for convenience, each battery 4 is disposed such that output terminals 16 face upward in the vertical direction. Output terminals 16 of adjacent batteries 4 are electrically connected to each other via bus bar 28 described later.

Separator 6 is also called an insulating spacer, and is made of, for example, a resin having an insulation property. Examples of the resin constituting separator 6 include thermoplastic resins such as polypropylene (PP), polybutylene terephthalate (PBT), polycarbonate (PC), and Noryl (registered trademark) resin (modified PPE).

Separator 6 has a plurality of first insulating members 6a and a pair of second insulating members 6b. Each first insulating member 6a is disposed between two adjacent batteries 4 and electrically insulates two batteries 4. Each second insulating member 6b extends in stacking direction X of batteries 4 and is brought in contact with the side surface of each battery 4. As a result, each battery 4 and restraint member 10 are electrically insulated. If necessary, second insulating member 6b may be configured to electrically insulate bus bar 28, which will be described later, and restraint member 10 from each other.

On the surface of second insulating member 6b facing battery 4, a plurality of ribs 6c arranged in stacking direction X of batteries 4 are provided. The spacing between adjacent ribs 6c corresponds to the dimension between the main surfaces of battery 4. When second insulating member 6b is fitted to the side surface of battery 4, the plurality of ribs 6c press the bottom surface of each battery 4. As a result, the positioning of each battery 4 in direction Z is performed.

The plurality of stacked batteries 4 are sandwiched between the pair of end plates 8. The pair of end plates 8 are disposed so as to be adjacent to batteries 4 that are located at both ends in stacking direction X of batteries 4 via first insulating members 6a. End plate 8 is made of, for example, a metal plate. By disposing first insulating member 6a between end plate 8 and battery 4, both are insulated.

Restraint member 10 is also called a bind bar and is a long member long in stacking direction X of batteries 4. In the present exemplary embodiment, the pair of restraint members 10 are arranged in direction Y perpendicular to stacking direction X of batteries 4, i.e., in the direction in which positive electrode terminal 16a, valve portion 18, and negative electrode terminal 16b are arranged. The plurality of batteries 4, separators 6, and the pair of end plates 8 are disposed between the pair of restraint members 10. Each restraint member 10 has flat surface portion 10a having a rectangular shape parallel to the side surface of battery 4 and flange portions 10b protruding from the upper side and the lower side of flat surface portion 10a toward battery 4.

By engaging the pair of end plates 8 with flat surface portion 10a of each restraint member 10, the plurality of batteries 4 are sandwiched in stacking direction X. Contact plate 20 is fixed to the surface of flat surface portion 10a facing each end plate 8 by welding or the like. Contact plate 20 is a member long in direction Z in which the top surface and the bottom surface of battery 4 are arranged, and has groove portion 20a on the surface facing end plate 8. Through-holes 20b are provided on the bottom surface of groove portion 20a to the surface of contact plate 20 that is brought in contact with flat surface portion 10a. In the present exemplary embodiment, three through-holes 20b are disposed in groove portion 20a at predetermined intervals in direction Z.

Flat surface portion 10a is provided with through-holes 11 at positions corresponding to through-holes 20b of contact plate 20. Further, end plate 8 has protrusion portion 8a long in direction Z on the surface facing flat surface portion 10a. The shape of protrusion portion 8a corresponds to the shape of groove portion 20a. Protrusion portion 8a is provided with fastening holes 8b at positions corresponding to through-holes 20b of contact plate 20.

Restraint member 10 and end plate 8 are coupled by fitting protrusion portion 8a into groove portion 20a. In a state where protrusion portion 8a is fitted into groove portion 20a, through-holes 11 of restraint member 10, through-holes 20b of contact plate 20, and fastening holes 8b of end plate 8 overlap each other. When fastening member 22 such as a screw is inserted to the holes, end plate 8 and restraint member 10 are fixed.

When the dimension of battery stack 2 in stacking direction X increases due to the expansion of battery 4, force is applied to protrusion portion 8a in the shearing direction. Further, force is applied to restraint member 10 in the direction in which both ends are pulled. As a result, the increase in the dimension of battery stack 2 and eventually the expansion of battery 4 can be suppressed. In general, metal has stronger tensile strength than bending strength.

Fixing portions 24 are disposed at both ends of restraint member 10 in stacking direction X. Battery stack 2 is fixed to a fixing target such as a battery pack housing or a vehicle body by fixing portion 24. Fixing portion 24 has through-hole 24a through which a fastening member, which is not shown, is inserted. The fixing target has a fastening hole, which is not shown, and the fastening hole and through-hole 24a are overlapped with each other, and the fastening member is inserted into the holes to fix battery stack 2 to the fixing target. Note that fixing portion 24 may be fixed to the fixing target by another method such as welding.

Figure 2:
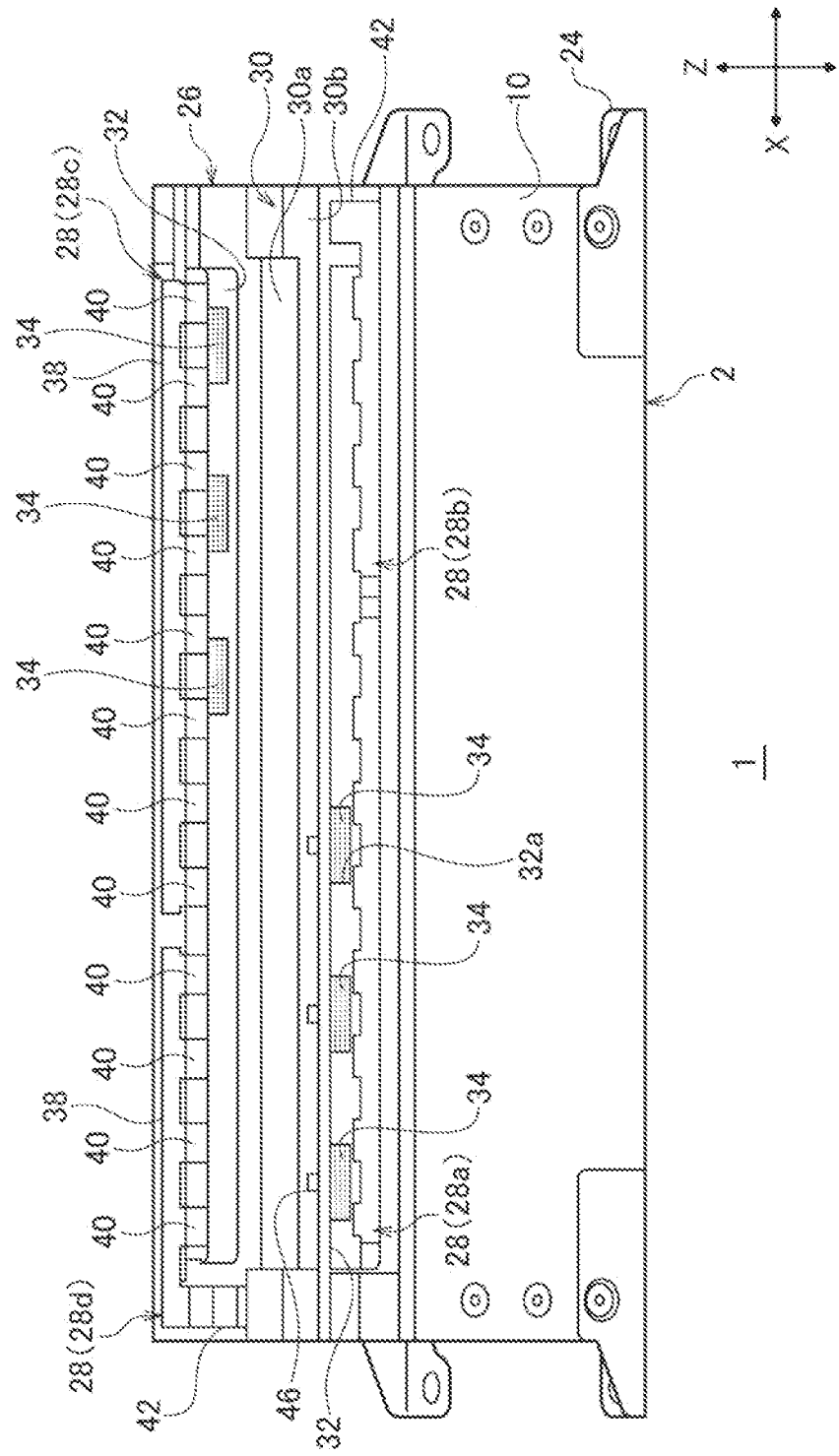
FIG. 2 is a perspective view of the battery module.
Figure 3:
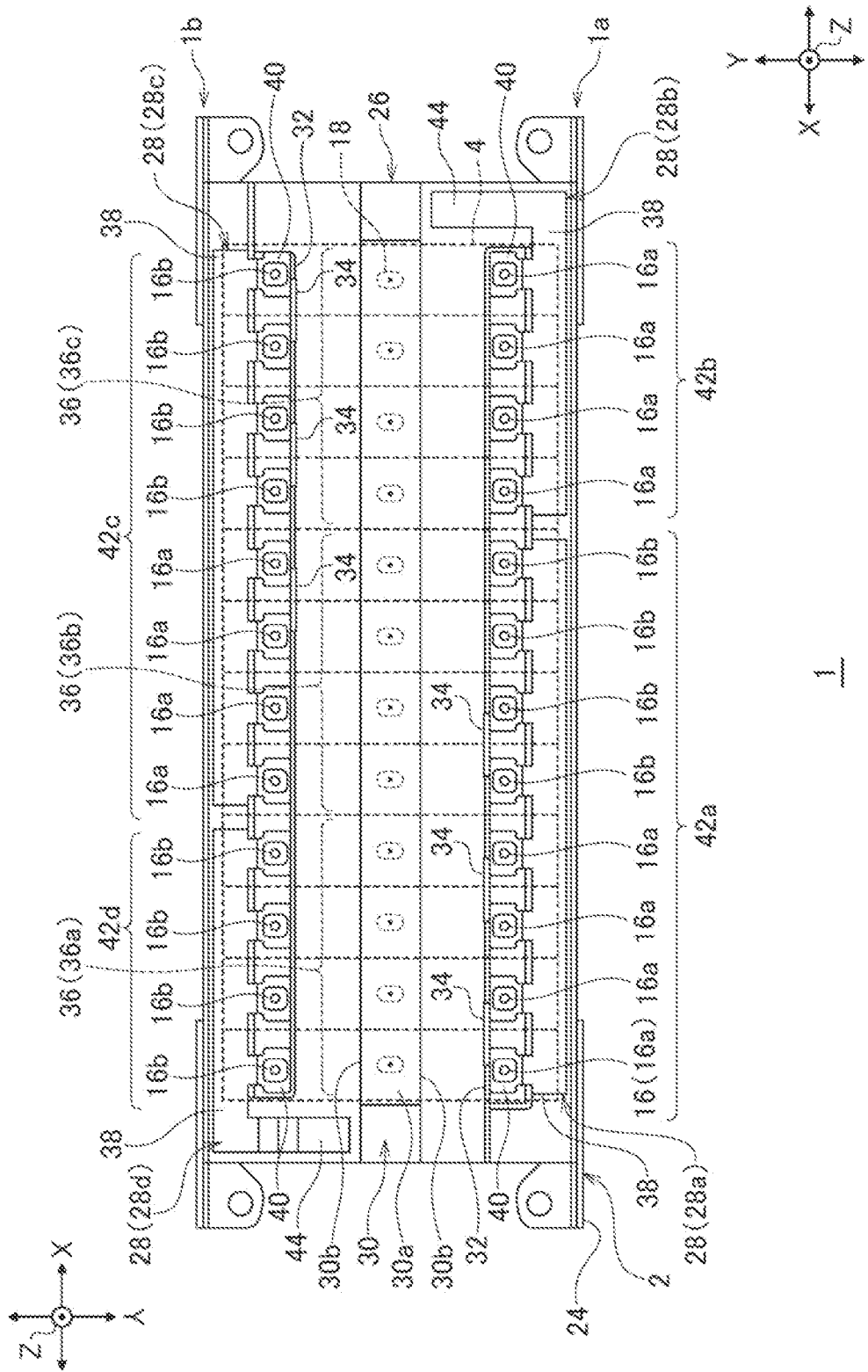
FIG. 3 is a plan view of the battery module.
Figure 4:
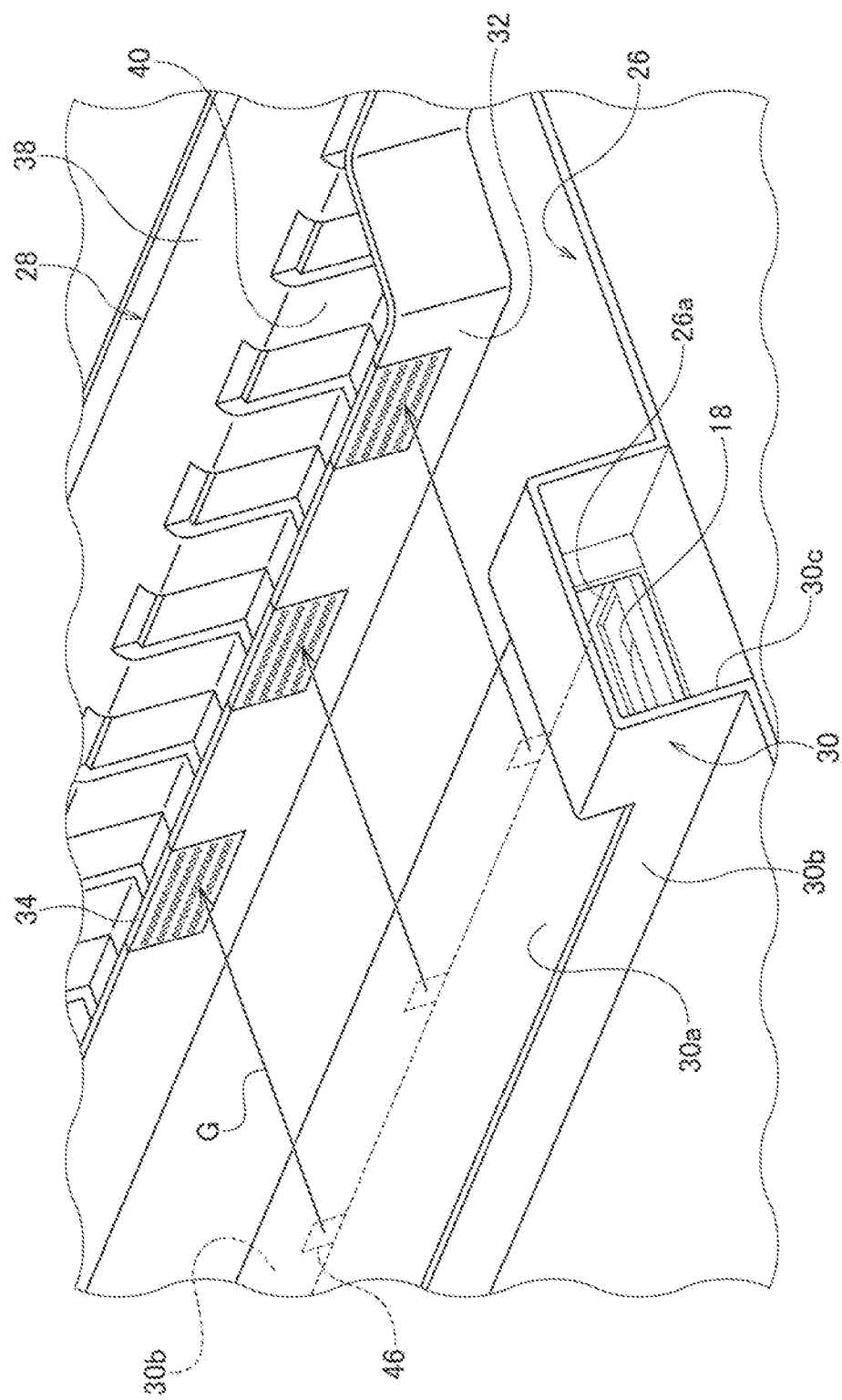
FIG. 4 is an enlarged perspective view showing a part of a bus bar plate.

Subsequently, battery module 1 including battery stack 2 described above will be described in detail. FIG. 2 is a perspective view of the battery module. FIG. 3 is a plan view of the battery module. FIG. 4 is an enlarged perspective view showing a part of a bus bar plate.

Battery module 1 includes battery stack 2, bus bar plate 26, a plurality of bus bars 28, exhaust duct 30, insulation wall 32, and a plurality of metal filters 34. In the present exemplary embodiment, bus bar plate 26, exhaust duct 30, and insulation wall 32 are integrally molded.

Bus bar plate 26 is stacked on the top surface of battery stack 2. A top cover, which is not shown, is further stacked above bus bar plate 26. Therefore, bus bar plate 26 is interposed between battery stack 2 and the top cover. Bus bar plate 26 is, for example, a member having a plate shape made of a resin having an insulation property. Bus bar plate 26 has opening 26a at a position corresponding to valve portion 18 of each battery 4. Further, bus bar plate 26 has an opening, which is not shown, at a position corresponding to output terminal 16 of each battery 4. As a result, output terminal 16 and valve portion 18 are exposed with the top surface of battery stack 2 being covered with bus bar plate 26.

The plurality of bus bars 28 are mounted on bus bar plate 26. Each bus bar 28 has body portion 38 and a plurality of connection portions 40. Body portion 38 is a portion having a band shape extending in stacking direction X of batteries 4. The plurality of connection portions 40 are portions each fixed to output terminal 16 of each battery 4. Each connection portion 40 is disposed at predetermined intervals in the extension direction of body portion 38, and protrudes from body portion 38 in direction Y intersecting stacking direction X. Therefore, each bus bar 28 has a comb-shape. Bus bar 28 of the present exemplary embodiment has body portion 38 that is located outside battery 4 in direction Y with respect to output terminal 16 and connection portion 40 that is disposed to protrude toward the center of battery 4.

Bus bar 28 is made of a metal such as copper or aluminum. Bus bar 28 groups the plurality of batteries 4 into a plurality of battery units 36 including at least two batteries 4. Then, in each battery unit 36, output terminals 16 of batteries 4 are connected in parallel. Further, battery units 36 are connected in series. In the present exemplary embodiment, output terminals 16 having the same polarity of four batteries 4 are stacked so as to be adjacent to each other to form first battery unit 36a, second battery unit 36b, and third battery unit 36c. First battery unit 36a, second battery unit 36b, and third battery unit 36c are arranged in this order in stacking direction X of batteries 4.

Further, in first battery unit 36a, positive electrode terminal 16a of each battery 4 is disposed on a portion of battery 4 closer to first end 1a of battery module 1 in direction Y, and negative electrode terminal 16b of each battery 4 is disposed on a portion of battery 4 closer to second end 1b of battery module 1 in direction Y. In second battery unit 36b, negative electrode terminal 16b of each battery 4 is disposed on the portion of battery 4 closer to first end 1a of battery module 1, and positive electrode terminal 16a of each battery 4 is disposed on the portion of battery 4 closer to second end 1b of battery module 1. In third battery unit 36c, positive electrode terminal 16a of each battery 4 is disposed on the portion of battery 4 closer to first end 1a of battery module 1, and negative electrode terminal 16b of each battery 4 is disposed on the portion of battery 4 closer to second end 1b of battery module 1.

Further, bus bar 28 includes first end side long bus bar 28a, first end side short bus bar 28b, second end side long bus bar 28c, and second end side short bus bar 28d. First end side long bus bar 28a and first end side short bus bar 28b are disposed on the side of first end 1a of battery module 1. Second end side long bus bar 28c and second end side short bus bar 28d are disposed on the portions of second end side long bus bar 28c and second end side short bus bar 28d closer to second end 1b of battery module 1.

First end side long bus bar 28a is fixed to positive electrode terminal 16a of each battery 4 of first battery unit 36a and negative electrode terminal 16b of each battery 4 of second battery unit 36b. As a result, positive electrode terminals 16a of batteries 4 of first battery unit 36a are connected in parallel, and negative electrode terminals 16b of batteries 4 of second battery unit 36b are connected in parallel. Further, four positive electrode terminals 16a of first battery unit 36a and four negative electrode terminals 16b of second battery unit 36b are connected in series. Four positive electrode terminals 16a of first battery unit 36a and four negative electrode terminals 16b of second battery unit 36b constitute first end side large terminal group 42a to which first end side long bus bar 28a is fixed.

Positive electrode terminals 16a of batteries 4 of third battery unit 36c are connected in parallel by first end side short bus bar 28b. First end side short bus bar 28b has external connection terminal 44 at an end facing the outside of battery module 1 in stacking direction X of batteries 4. External connection terminal 44 is connected to an external load via wiring routed to the outside of battery module 1. First end side short bus bar 28b is fixed to four positive electrode terminals 16a of third battery unit 36c to constitute first end side small terminal group 42b adjacent to first end side large terminal group 42a.

Second end side long bus bar 28c is fixed to positive electrode terminal 16a of each battery 4 of second battery unit 36b and negative electrode terminal 16b of each battery 4 of third battery unit 36c. As a result, positive electrode terminals 16a of batteries 4 of second battery unit 36b are connected in parallel, and negative electrode terminals 16b of batteries 4 of third battery unit 36c are connected in parallel. Further, four positive electrode terminals 16a of second battery unit 36b and four negative electrode terminals 16b of third battery unit 36c are connected in series. Four positive electrode terminals 16a of second battery unit 36b and four negative electrode terminals 16b of third battery unit 36c constitute second end side large terminal group 42c to which second end side long bus bar 28c is fixed.

Negative electrode terminals 16b of batteries 4 of first battery unit 36a are connected in parallel by second end side short bus bar 28d. Second end side short bus bar 28d has external connection terminal 44 at an end facing the outside of battery module 1 in stacking direction X of batteries 4. External connection terminal 44 is connected to an external load via wiring routed to the outside of battery module 1. Second end side short bus bar 28d is fixed to four negative electrode terminals 16b of first battery unit 36a to constitute second end side small terminal group 42d adjacent to second end side large terminal group 42c.

Exhaust duct 30 extends in stacking direction X of batteries 4 and is connected to each valve portion 18 of the plurality of batteries 4. Exhaust duct is disposed so as to overlap each valve portion 18 in direction Z. Therefore, exhaust duct 30 is disposed between positive electrode terminal 16a and negative electrode terminal 16b of each battery 4 in direction Y. In other words, exhaust duct 30 is disposed in direction Y between bus bar 28 disposed on the portion of bus bar 28 closer to first end 1a of battery module 1 and bus bar 28 disposed on the portion of bus bar 28 closer to second end 1b of battery module 1.

Exhaust duct 30 is disposed so as to surround opening 26a of bus bar plate 26. Specifically, exhaust duct 30 has top wall 30a that overlaps opening 26a in direction Z and a pair of sidewalls 30b that are disposed on both sides of opening 26a in direction Y. The pair of sidewalls 30b protrude in direction Z from the top surface of bus bar plate 26. Top wall 30a extends parallel to the top surface of battery stack 2 and connects the upper ends of the pair of sidewalls 30b. As a result, a gas flow path extending in stacking direction X of batteries 4 is formed above each valve portion 18.

Exhaust duct 30 has a metal plate, which is not shown, on an inner surface side of top wall 30a. The metal plate enhances the strength and heat resistance of top wall 30a. The gas ejected from valve portion 18 first hits top wall 30a and then diffuses into exhaust duct 30. Exhaust duct 30 has opening 30c at both ends of battery 4 in stacking direction X. Opening 30c is connected to the outside of battery module 1. Further, exhaust duct 30 has through-holes 46 for connecting the inside and the outside of exhaust duct 30 on the wall surface facing bus bar 28. At least a part of the gas in exhaust duct 30 leaks out of exhaust duct 30 through through-holes 46. The gas leaked to the outside of exhaust duct 30 stays in the space between battery stack 2 and the top cover.

Insulation wall 32 is disposed adjacent to bus bar 28. Insulation wall 32 protrudes from the top surface of bus bar plate 26 in direction Z, extends in stacking direction X, and encloses a row of the plurality of output terminals 16 and the plurality of connection portions 40. As a result, the insulation property with respect to the surroundings of output terminals 16 and connection portions 40 can be improved. At least a part of insulation wall 32 is interposed between valve portion 18 and bus bar 28 in direction Y, in other words, between exhaust duct 30 and bus bar 28.

Metal filter 34 includes a metal mesh, a porous metal plate such as a punching metal or an expanded metal, or the like. Metal filter 34 is disposed between valve portion 18 and output terminal 16 in a first direction in which valve portion 18 and output terminal 16 are arranged, i.e., in the direction intersecting stacking direction X. Further, metal filter 34 is disposed within the extension range of battery 4 belonging to a first terminal group to which any first bus bar of bus bars 28 is fixed in stacking direction X of batteries 4. The first terminal group is a set of output terminals 16 coupled to the same bus bar (first bus bar). Further, battery 4 belonging to the first terminal group means battery 4 output terminal 16 of which is included in the first terminal group.

Further, metal filter 34 is disposed on the gas distribution path from valve portion 18 to the first bus bar. In the present exemplary embodiment, gas distribution path G from valve portion 18 to bus bar 28 through through-hole 46 of exhaust duct 30 is formed on bus bar plate 26. Metal filter 34 is disposed so as to intersect distribution path G. Further, metal filter 34 is disposed in a region sandwiched between through-hole 46 and the first bus bar in the first direction. Therefore, metal filter 34 is disposed so as to be separated from exhaust duct 30 when viewed in stacking direction X of batteries 4 and overlap through-hole 46 when viewed in direction Y.

Further, metal filter 34 is fixed to insulation wall 32. Specifically, insulation wall 32 has cutout 32a in a region interposed between exhaust duct 30 and bus bar 28 in direction Y. Metal filter 34 is fitted into this cutout 32a.

Further, battery module 1 includes the first terminal group to which the first bus bar is fixed and a second terminal group to which a second bus bar different from the first bus bar is fixed and adjacent to the first terminal group. Then, metal filter 34 is disposed so as to be out of the extension range of battery 4 closest to the second terminal group among batteries 4 belonging to the first terminal group in stacking direction X of batteries 4. That is, metal filter 34 is disposed so as not to overlap battery 4 closest to the second terminal group when viewed in the first direction.

In the present exemplary embodiment, first end side long bus bar 28a corresponds to the first bus bar, first end side large terminal group 42a corresponds to the first terminal group, and direction Y corresponds to the first direction. That is, a part of metal filter 34 is disposed between output terminal 16 and valve portion 18 located on the side of first end 1a of battery module 1 in direction Y in which valve portion 18 and output terminal 16 are arranged. Further, metal filter 34 is disposed within the extension range of battery 4 belonging to first end side large terminal group 42a to which first end side long bus bar 28a is fixed in stacking direction X of batteries 4. That is, metal filter 34 is disposed between valve portion 18 and output terminal 16 in direction Y in the region near first end 1a closer than valve portion 18, and disposed within the extension range of first battery unit 36a and second battery unit 36b in stacking direction X.

Further, in the present exemplary embodiment, first end side short bus bar 28b corresponds to the second bus bar, and first end side small terminal group 42b corresponds to the second terminal group. That is, metal filter 34 is disposed so as to be out of the extension range of battery 4 closest to first end side small terminal group 42b among batteries 4 belonging to first end side large terminal group 42a, specifically, of battery 4 closest to third battery unit 36c among batteries 4 of second battery unit 36b, in stacking direction X of batteries 4. Further, metal filter 34 of the present exemplary embodiment is out of the extension range of two batteries 4 on the side closer to third battery unit 36c among batteries 4 of second battery unit 36b.

Alternatively, in the present exemplary embodiment, second end side long bus bar 28c corresponds to the first bus bar, second end side large terminal group 42c corresponds to the first terminal group, and direction Y corresponds to the first direction. That is, a part of metal filter 34 is disposed between output terminal 16 and valve portion 18 located on the side of second end 1b of battery module 1 in direction Y in which valve portion 18 and output terminal 16 are arranged. Further, metal filter 34 is disposed within the extension range of battery 4 belonging to second end side large terminal group 42c to which second end side long bus bar 28c is fixed in stacking direction X of batteries 4. That is, metal filter 34 is disposed between valve portion 18 and output terminal 16 in direction Y in the region near second end 1b closer than valve portion 18, and disposed within the extension range of second battery unit 36b and third battery unit 36c in stacking direction X.

Further, in the present exemplary embodiment, second end side short bus bar 28d corresponds to the second bus bar, and second end side small terminal group 42d corresponds to the second terminal group. That is, metal filter 34 is disposed so as to be out of the extension range of battery 4 closest to second end side small terminal group 42d among batteries 4 belonging to second end side large terminal group 42c, specifically, of battery 4 closest to first battery unit 36a among batteries 4 of second battery unit 36b, in stacking direction X of batteries 4. Further, metal filter 34 of the present exemplary embodiment is out of the extension range of two batteries 4 on the side closer to first battery unit 36a among batteries 4 of second battery unit 36b.

That is, battery module 1 includes a row of the plurality of valve portions 18 arranged in stacking direction X, a first row of the plurality of output terminals 16 arranged in stacking direction X on the side of first end 1a of battery module 1, and a second row of the plurality of output terminals 16 arranged in stacking direction X on the side of second end 1b of battery module 1. A part of metal filter 34 is disposed between the row of valve portions 18 and the first row of output terminals 16. Therefore, metal filter 34 is displaced on the side of first end 1a with respect to valve portion 18 in direction Y. Then, this metal filter 34 is disposed within the range of the battery group coupled by one bus bar disposed on the same side as the side where metal filter 34 is displaced. Alternatively, metal filter 34 is disposed so as to fit within the extension range of one bus bar disposed on the same side as the side where metal filter 34 is displaced.

Further, another part of metal filter 34 is disposed between the row of valve portions 18 and the second row of output terminals 16. Therefore, this metal filter 34 is displaced on the side of second end 1b with respect to valve portion 18 in direction Y. Then, this metal filter 34 is disposed within the range of the battery group coupled by one bus bar disposed on the same side as the side where metal filter 34 is displaced. Alternatively, metal filter 34 is disposed so as to fit within the extension range of one bus bar disposed on the same side as the side where metal filter 34 is displaced.

As described above, battery module 1 according to the present exemplary embodiment includes battery stack 2 having the plurality of stacked batteries 4, the plurality of bus bars 28, and metal filter 34. Each battery 4 has valve portion 18 for discharging a gas generated inside, and output terminal 16. Bus bar 28 electrically connects output terminals 16 of the plurality of batteries 4. Specifically, bus bar 28 groups the plurality of batteries 4 into a plurality of battery units 36 including at least two batteries 4, connects output terminals 16 of batteries 4 in each battery unit 36 in parallel, and connects battery units 36 in series. Metal filter 34 is disposed between valve portion 18 and output terminal 16 in the first direction in which valve portion 18 and output terminal 16 are arranged and disposed within the extension range of battery 4 belonging to the first terminal group to which any first bus bar of bus bars 28 is fixed in stacking direction X of batteries 4.

By providing metal filter 34 on battery stack 2, fine particles contained in the gas ejected from valve portion 18 can be captured by metal filter 34. As a result, it is possible to suppress the risk of occurrence of ignition outside the battery module and an increase in scale of ignition as the capacity of battery 4 increases. Therefore, the safety of battery module 1 can be enhanced. Further, by making the mesh made of metal, it is possible to prevent the mesh from being melted and clogged by a high temperature gas. As a result, it is possible to prevent the gas distribution from being obstructed by providing the mesh. Further, by disposing metal filter 34 between valve portion 18 and output terminal 16, it is possible to avoid an increase in size of battery module 1 due to the installation of metal filter 34.

On the other hand, when metal filter 34 is disposed between valve portion 18 and output terminal 16, metal filter 34 may be blown off toward output terminal 16 by the pressure of the ejected gas. In this case, metal filter 34 that has been blown off may straddle two adjacent bus bars 28 and come into contact with them. Alternatively, metal filter 34 may straddle two output terminals 16 to which different bus bars 28 are fixed and come into contact with them. When metal filter 34 comes into contact with these two bus bars 28 or these two output terminals 16, output terminals 16 which would not otherwise normally be directly coupled are short-circuited. As a method of preventing this short-circuit, it is conceivable to coat the surface of the metal mesh with an insulating resin. However, this method increases the cost, and the coating resin may be melted by the heat of the gas.

On the other hand, in the present exemplary embodiment, metal filter 34 is disposed within the range in which batteries 4 belonging to the first terminal group to which the first bus bar is fixed are arranged. That is, metal filter 34 is disposed within the range in which output terminals 16 are fixed by the same bus bar are arranged. Therefore, even if metal filter 34 is blown off toward output terminal 16, metal filter 34 comes in contact with only the first bus bar. Alternatively, metal filter 34 comes in contact with only output terminals 16 having the same potential connected in series or in parallel by the first bus bar. Therefore, it is possible to prevent metal filter 34 from causing a short-circuit between output terminals 16 described above. Therefore, according to the present exemplary embodiment, it is possible to enhance the safety while maintaining the reliability of battery module 1. Further, since it is not necessary to consider the insulation distance between metal filter 34 and bus bar 28, the degree of freedom in disposing metal filter 34 can be increased.

Further, battery module 1 further includes exhaust duct 30 extending in stacking direction X of batteries 4 and connected to each valve portion 18 of the plurality of batteries 4. Exhaust duct 30 has through-holes 46 for connecting the inside and the outside of exhaust duct 30 on the wall surface facing the first bus bar. Therefore, gas distribution path G from valve portion 18 to the first bus bar through through-hole 46 of exhaust duct 30 is formed in battery module 1. Then, metal filter 34 is disposed on this distribution path G. As a result, fine particles contained in the gas discharged from batteries 4 can be captured more efficiently. Further, by leaking the gas discharged from batteries 4 through through-hole 46, the gas flow can be divided into a plurality of flows, and the gas can be brought into contact with bus bar 28 or the like. As a result, the temperature of the gas when it is discharged to the outside of battery module 1 can be lowered.

Further, metal filter 34 is disposed in a region sandwiched between through-hole 46 and the first bus bar in the first direction in which valve portion 18 and output terminal 16 are arranged. That is, metal filter 34 is separated from valve portion 18 and exhaust duct 30. As a result, it is possible to reduce the possibility that metal filter 34 is blown off by the pressure of the gas ejected from batteries 4. Further, when metal filter 34 constitutes a part of exhaust duct 30, the opening ratio of exhaust duct 30 may increase and the amount of gas leaking from exhaust duct 30 may become excessive. However, according to the present exemplary embodiment, it is possible to suppress such leakage of an excessive amount of gas. Moreover, in the structure in which metal filter 34 is disposed immediately above valve portion 18, battery module 1 can be increased in size due to the stack structure of metal filter 34 and exhaust duct 30, but according to the present exemplary embodiment, such an increase in size can be avoided.

Further, battery module 1 includes the first terminal group connected to the first bus bar and the second terminal group connected to the second bus bar different from the first bus bar and adjacent to the first terminal group. Then, metal filter 34 is disposed so as to be out of the extension range of battery 4 closest to the second terminal group among batteries 4 belonging to the first terminal group in stacking direction X of batteries 4. As a result, it is possible to unfailingly prevent metal filter 34 from causing a short-circuit between output terminals 16 described above. Therefore, the reliability of battery module 1 can be further enhanced.

Further, battery module 1 includes insulation wall 32 adjacent to bus bar 28, and metal filter 34 is fixed to insulation wall 32. As a result, it is not necessary to separately provide a support structure for metal filter 34, and therefore the structure of battery module 1 can be suppressed from becoming complicated.

The exemplary embodiment of the present invention has been described in detail above. The above-described exemplary embodiment merely shows a specific example in carrying out the present invention. The content of the exemplary embodiment does not limit the technical scope of the present invention, and many design changes such as modification, addition, and deletion of components can be made without departing from the idea of the invention specified in the claims. A new exemplary embodiment to which a design change has been added has the effects of an exemplary embodiment and a variation to be combined. In the above-described exemplary embodiment, the contents that can be changed in design are emphasized by adding notations such as "of the present exemplary embodiment" and "in the present exemplary embodiment," but design changes are allowed for contents without such notations. Any combination of the above components is also effective as an aspect of the present invention. The hatching added to the cross section of the drawing does not limit the material to which the hatching is added.

Metal filter 34 may be disposed within the extension range of battery 4 belonging to first end side small terminal group 42b connected to first end side short bus bar 28b or within the extension range of battery 4 belonging to second end side small terminal group 42d connected to second end side short bus bar 28d. The shape of battery 4 is not particularly limited and may be cylindrical or the like. A number of batteries 4 included in battery stack 2, a number of batteries 4 constituting battery unit 36, a number of battery units 36, a number of metal filters 34, and the like are not particularly limited. The structure of each portion of battery stack 2, including the shape of separator 6 and the fastening structure between end plate 8 and restraint member 10, is not particularly limited.

REFERENCE MARKS IN THE DRAWINGS 1 battery module
2 battery stack
4 battery
16 output terminal
18 valve portion
28 bus bar
30 exhaust duct
32 insulation wall
34 metal filter
36 battery unit
46 through-hole

The invention claimed is:
1. A battery module comprising:
a battery stack configured to have a plurality of batteries stacked, each of the batteries including a valve portion and an output terminal on a terminal surface of the battery stack, the valve portion being configured to release a gas generated in the batteries;
a plurality of bus bars configured to electrically connect the output terminals of the plurality of batteries together, the plurality of bus bars grouping the plurality of batteries into a plurality of battery units each including at least two of the plurality of batteries, the plurality of bus bars each connecting in parallel the output terminals of at least two of the batteries in a corresponding one of the battery units, the plurality of bus bars connecting in series the battery units,
wherein the plurality of bus bars includes a first bus bar configured to connect together a first terminal group of the output terminals of a first subset of batteries of the plurality of batteries; and a metal filter configured to be disposed within a predetermined region on one side of the valve portions when viewed in a direction perpendicular to the terminal surface, the predetermined region is defined (i) between the valve portions and the first terminal group of the first subset of batteries in a first direction in which the valve portions and the first terminal group are arranged, and (ii) between ends of the first subset of batteries in a stacking direction of the plurality of batteries, the battery module further comprising an exhaust duct configured to extend in the stacking direction of the plurality of batteries and to be connected to the valve portion of each of the plurality of batteries, wherein the exhaust duct has a through-hole that connects inside and outside of the exhaust duct on a wall surface facing the first bus bar, and the metal filter is disposed on a distribution path along which the gas travels from the valve portions toward the first bus bar via the through-hole.

2. The battery module according to claim 1, wherein the metal filter is disposed in a region sandwiched between the through-hole and the first bus bar in the first direction.

3. The battery module according to claim 1, wherein the plurality of bus bars further includes a second bus bar configured to connect together a second terminal group of the output terminals of a second subset of batteries of the plurality of batteries, the first bus bar and the second bus bar being adjacent to, and physically separate from, each other in the stacking direction of the plurality of batteries, wherein the predetermined region excludes a region defined by a perimeter of a battery of the first subset of batteries which is closest to the second terminal group.

4. The battery module according to claim 1, further comprising an insulation wall configured to be adjacent to each of the plurality of bus bars, wherein the metal filter is fixed to the insulation wall.

* * * * *